April 1, 1952 D. H. REEVES 2,591,293
FLUID VALVE
Filed April 16, 1945 4 Sheets-Sheet 1

Inventor
Donald H. Reeves
By Henry C. Dyberg
His Attorney

April 1, 1952     D. H. REEVES     2,591,293
FLUID VALVE

Filed April 16, 1945     4 Sheets-Sheet 2

April 1, 1952 D. H. REEVES 2,591,293
FLUID VALVE

Filed April 16, 1945 4 Sheets-Sheet 3

Inventor
Donald H Reeves
By Henry G. Sybrig
His Attorney

April 1, 1952

D. H. REEVES 2,591,293

FLUID VALVE

Filed April 16, 1945

Patented Apr. 1, 1952

2,591,293

UNITED STATES PATENT OFFICE 2,591,293

FLUID VALVE

Donald H. Reeves, Dayton, Ohio, assignor to Donald H. Reeves And Associates, Beulah, Mich., a partnership Application April 16, 1945, Serial No. 588,666

12 Claims. (Cl. 277—20)

This invention relates to fluid valve assemblies or faucets and more particularly to valves or faucets that may be frequently opened or closed.

This invention is related to the invention disclosed in my copending applications for United States Letters Patent Serial No. 508,721 and Serial No. 509,633 ripening into Patents Nos. 2,497,557 and 2,497,558 respectively, each dated February 14, 1950, and also to the invention disclosed in the application for Fuid Valve, Serial No. 588,665, filed April 16, 1945. This application discloses improvements upon the former applications.

This invention relates particularly to valve assemblies having multiple ports that are used in various ways to overcome the necessity of having numerous single port valve assemblies.

In the past, valves and faucets, particularly those commonly used in connection with lavatories, bath tubs, showers, sinks, laundry tubs and other such applications, have mainly been made as single port valves, where each assembly controls only a single fluid flow. This being the case, where both hot and cold water are available, it has been the common practice to have two faucets or two valves connected to a common but separate outlet at each place of usage, as explained in my aforementioned application filed herewith. There are also many cases where the present practice is to have three or more valves at one point of usage.

In many localities the water is so hard that either rain water or softened water is used for all washing; but it is desirable to have the regular water supply available for use for drinking and cooking purposes and for other purposes where the soft water is not advantageous. In such cases, it is customary to have both hot and cold soft water and cold city water available at the kitchen sink and in all lavatories. The present practice in such cases is to either furnish three separate faucets at each point where water is needed, or else have three separate valves connected to a common outlet, each valve or faucet having a control handle which must be operated independently. The same combination of valves or faucets is necessary where there are hot and cold city water and ice water available at one place, as is frequently found in hotel rooms. In the latter case, however, the ice water valve is usually of the "self-closing" type, that is, of the type that will close as soon as the operator releases the handle, whereas the other valves are usually of the "holding" type that remain open until the operator closes them.

Often there is a need of a mixture of hot and cold water delivered to either of two outlets at one place, such as to a tub and to a shower over the tub, or to a kitchen sink or to the spray used at the sink for rinsing dishes or vegetables. It is now common practice to either have two pairs of hot and cold water valves, one pair for each outlet, making a total of four separate valves, or else to have one pair of hot and cold water valves and a three-way valve to direct the water to the proper outlet.

Valves and faucets now in common use have most of their working parts in the water chamber, where the corrosive action of the water often makes the valve soon unusable. This has been particularly true in regard to "mixer" or multiple valves.

Valves and faucets now in common use are so made that unless extreme care is exercised in closing the valves, they may remain partically open, causing a drip or a small stream to continue to run, which is both wasteful and very annoying. When there are several valves connected to a common outlet, it is often necessary, in case of a drip, to try closing all of the valves before the correct one will be discovered.

An object of this invention is to improve valve assemblies. More specifically, an object of this invention is to provide valve assemblies such that a single assembly will replace several separate valve assemblies at one point of usage, thereby simplifying the necessary connections and adding greatly to the convenience of usage of the valve system.

Another object of this invention is to provide multiple valve assemblies so made that when the operator attempts to close the valve or valves that may be open, closure of all valves will be complete, so as to insure no leakage, regardless of how carelessly the closing operation has been performed.

Another object of this invention is to provide multiple valve assemblies so made that the desired flow through the various ports is controlled by a single handle.

Another object of this invention is to provide multiple valve assemblies so made that closure of any and all open valves can be accomplished by means of a single control means.

Another object of this invention is to provide multiple valve assemblies so made that any desired mixture of two fluids can be delivered in any desired quantity to either of two outlets.

Another object of my invention is to provide multiple valve assemblies so made that any desired mixture of two fluids can be delivered in any desired quantity or a third fluid can be delivered in any desired quantity, all from a single outlet.

Other objects and advantages reside in the construction of parts, the combination thereof and the mode of operation, as will become more apparent from the following description.

Referring to the drawings.

In the drawings, the reference character 30 designates a valve support, such as a lavatory, bath tub, sink or the like. This support 30 is provided with an aperture receiving the main body 32 of a valve assembly. This main body 32 is preferably fastened to the support 30 by any suitable means, various types of which are shown in my copending applications.

Figures 1, 2, 3, 4, 5:
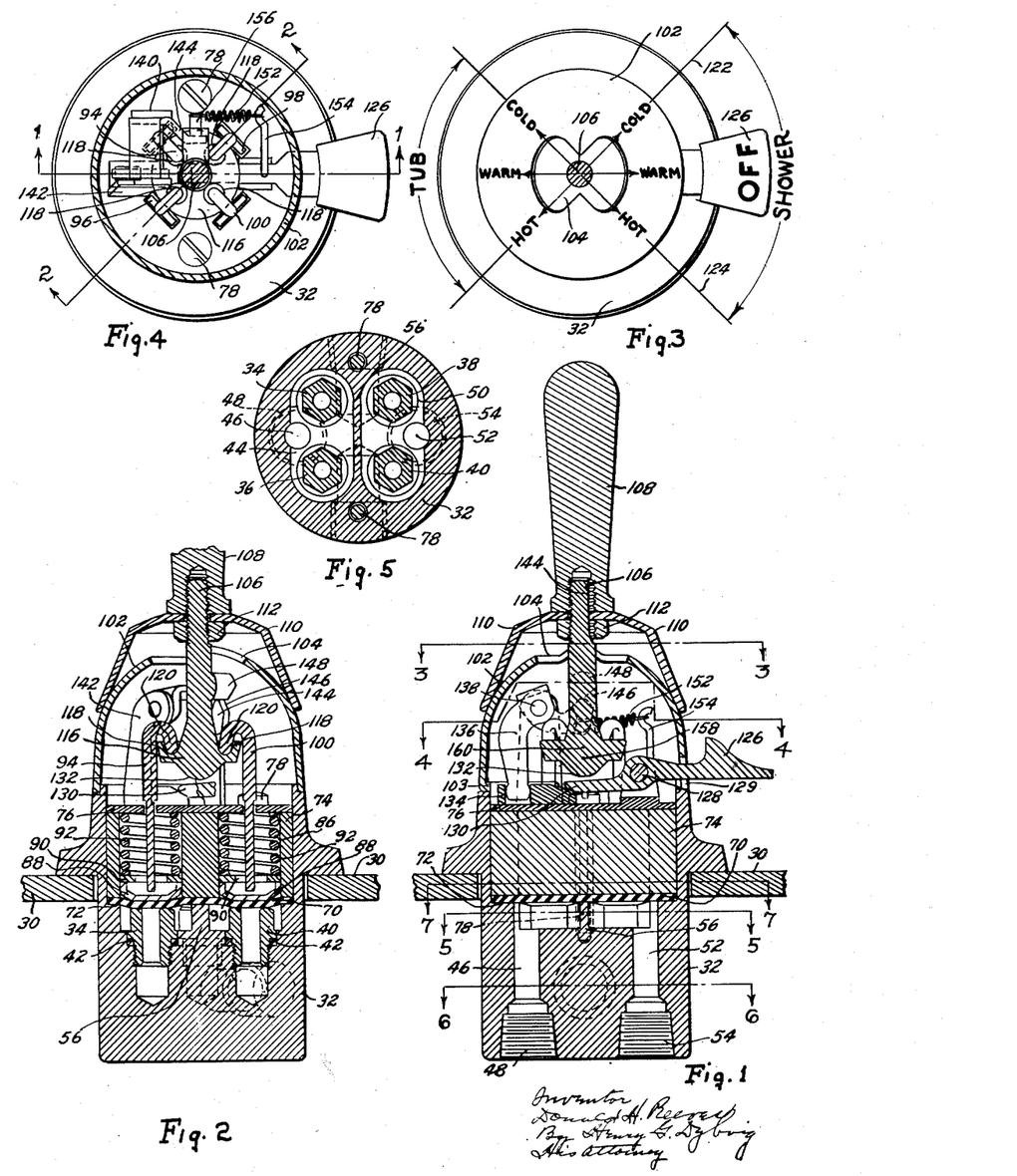
Figure 1 is a vertical cross sectional view of one embodiment of my invention, showing the parts as they would be when all valves are in the closed position. This view is taken approximately along the cross sectional line 1—1 of Figure 4.
Figure 2 is a vertical cross sectional view of the same embodiment, approximately along the cross sectional line 2—2 of Figure 4, showing two of the valves in their closed positions.
Figure 3 is a horizontal cross sectional view of the same embodiment, taken approximately along the cross sectional line 3—3 of Figure 1, with the handle socket omitted.
Figure 4 is a horizontal cross sectional view of the same embodiment, taken approximately along the cross sectional line 4—4 of Figure 1, showing the valve operating mechanism.
Figure 5 is a horizontal cross sectional view of the same embodiment, taken approximately along the cross sectional line 5—5 of Figure 1, showing the water outlet chambers.

As best seen in Figure 5, the body 32 has four replaceable fluid orifice members 34, 36, 38 and 40. These orifice members are threaded into the main body 32, with gaskets 42 making a leakproof joint. Orifice members 34 and 40 have been so shown in Figure 2. Obviously, these orifice members can be made as integral parts of the main body, if desired. As best shown in Figure 5, orifice members 34 and 36 empty into chamber 44 which is connected by means of duct 46 to outlet connection 48 which is connected to any suitable outlet, as for example, the shower over a bath tub. In like manner, orifice members 38 and 40 empty into chamber 50 which is connected by means of duct 52 to outlet connection 54 which is connected to any suitable outlet, as for example, the nozzle emptying into a bath tub. These two chambers, 44 and 50, are separated by partition 56, which is a part of the main body member.

Figure 6:
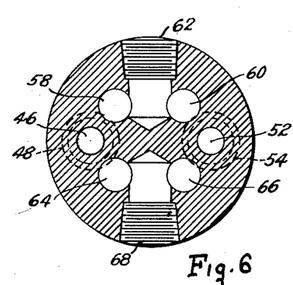
Figure 6 is a horizontal cross sectional view of the same embodiment taken approximately along the cross sectional line 6—6 of Figure 1, showing the water inlet connections.

Each of the orifice members connects by means of ducts to one of the fluid inlets, as best seen in Figure 6. The orifice in member 34 through duct 58 and the orifice in member 38 through duct 60 both connect with fluid inlet 62, which can be connected to the supply of any suitable fluid, as for example, hot water. Likewise, the orifice in member 36 through duct 64 and the orifice in member 40 through duct 66 both connect with fluid inlet 68, which can be connected to the supply of any second suitable fluid, such as cold water.

A single diaphragm 70 of rubber-like material extends across the upper ends of all four orifices and is supported by ledge 72 and partition 56 of the body 32. A spring housing 74 bears upon the upper surface of the diaphragm 70 and a retainer 76 rests upon the top of the housing 74. The diaphragm 70, the spring housing 74 and the retainer 76 are all held rigidly together as shown by means of screws 78, which go freely through the diaphragm 70, the spring housing 74 and the retainer 76 and screw into the body 32. Thus, the diaphragm 70 is clamped between the body 32 and the spring housing 74, preventing any fluid from passing from the chambers 44 or 50 to any of the upper or working parts of the valve assembly.

Figure 7:
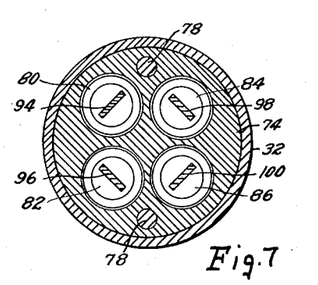
Figure 7 is a horizontal cross sectional view of the same embodiment taken approximately along the cross sectional line 7—7 of Figure 1, being a section through the spring chambers.

As best seen in Figure 7, the spring housing 74 has four vertical cylindrical holes 80, 82, 84 and 86, which are concentric respectively with the orifice members 34, 36, 38 and 40. In each of these holes is a plunger 88, shown in the hole 80, above which plunger is a disc 90 and above that a spring 92, the lower end of which rests on the disc 90 and the upper end of which is confined by retainer 76 so that, unless otherwise prevented from doing so, the spring 92 will force the plunger 88 downwardly and that in turn will force the section of diaphragm 70 directly below the plunger 88 downwardly, so as to close the upper opening of the orifice in member 34 and thereby prevent fluid from flowing through that orifice. Spring 92 is made of sufficient pressure so as to cause the diaphragm 70 to close the orifice against the highest presure and velocity that will be encountered.

A lifter member 94 is so connected to the disc 90 that when the lifter member 94 is raised, it will cause the disc 90 to rise, which in turn allows the plunger 88 and the portion of the diaphragm 70 directly below it to rise, due to the pressure of the fluid in the orifice in member 34, so that orifice is now open and fluid can flow therefrom. Each of the other three cylindrical holes in the spring housing 74 has a plunger, a disc, a spring and a lifting member similar to those described and designated in hole 80. As we will later have need for separate designations for the four lifter members, we will designate the lifters over orifices in the members 34, 36, 38 and 40, as 94, 96, 98 and 100 respectively.

Resting on the upper end of body member 32 is a cap 102. This cap has a tongue 103 which engages a slot in the top of body 32, so that the cap cannot turn with respect to the body. Through an aperture 104 in the cap 102, as best shown in Figure 3, projects a handle pivot member 106, on which are carried control handle 108, handle socket 110 and lock nut 112, the lock nut and the threaded handle permitting of adjustment of the parts. The pivot member 106 has a flattened section 114 which goes through a hole of like shape in the socket 110, so that the socket will not turn in relation to the pivot member and designations on the socket as to handle movements will be correctly placed. The lower edge of the socket 110 rests on the arcuate upper surface of the cap 102.

The lower end of pivot member 106 terminates in a somewhat disc-like section 116, in the upper surface of which are four depressions 118 having spherical bottoms and tapered sides in which depressions rest the spherically ended portions 120 of the lifting members. Referring to Figure 4, it will be seen that these four depressions are spaced approximately 90° apart around the center of the valve assembly and are in the same directions from the center of the valve assembly as are the cylindrical holes in which the lifter members operate.

Control handle 108, which is fastened rigidly to the pivot member 106 and the handle socket 110, is restricted in its movement by the shape of the aperture 104 in the cap 102, through which the stem of the pivot member 106 projects. The handle 108 can be moved from its vertical or central position in either direction along a line 122 or along a line 124 or anywhere between these two lines, as permitted by the aperture 104. When moved in any of these directions, the handle assembly, which includes handle 108, pivot member 106, socket 110 and lock nut 112, will rotate about the center of the spherical portion of the cap 102, since the edge of socket 110 is resting on the spherical end of the cap. If, therefore, the handle 108 is moved from its vertical position along the line 122 toward the point marked "Cold," as shown in Figure 3, depression 118 in the disc-like portion 116 of pivot member 106 will rise and will therefore cause lifter member 96 to rise, allowing orifice in member 36 to open, and if the valve is connected as stated in the foregoing description, cold water will flow to the shower outlet. If, on the other hand, the handle 108 is moved along line 124 toward "Hot," then the lifter 94 will be caused to rise, allowing orifice in member 34 to open so that hot water will flow to the shower. If the control handle is moved to the right, as viewed in Figure 3, in some direction between the lines 122 and 124, then both the lifters 94 and 96 will be raised, the relative amount depending upon the direction of the movement of the handle, so that a mixture of hot and cold water will flow to the shower. Obviously, the farther the control handle is moved from its central position, the more the valves will be opened and the greater will be the flow through them. If the handle 108 is moved from its vertical position along line 124 toward the point marked "Cold," lifter member 100 will be raised, opening the orifice in member 40 and allowing cold water to flow into the tub, while if the handle 108 is moved along line 122 toward the point marked "Hot," the lifter member 98 will be raised and the orifice in member 38 will open, allowing hot water to flow to the tub. If the handle 108 is moved to the left, as viewed in Figure 3, in some direction between the lines 122 and 124, then both lifters 98 and 100 will be raised, the relative amount depending upon the direction of the movement of the handle, so a mixture of hot and cold water will flow into the tub. Thus it is possible by the movement of the one control handle in various directions to cause any desired mixture of the two inlet fluids to flow in any desired quantity from either of two outlets as may be desired. The principles used in the mixing of the two liquids is the same as that disclosed in my copending application Serial No. 509,633, now Patent No. 2,497,558, and the aforementioned application Serial No. 588,665, filed April 16, 1945, in which applications the principles and operations are described in more detail.

When the control handle 108 has been moved away from its vertical or central position, one or more of the compression springs, such as 92, which are used to close the various orifices, are compressed and therefore tend to pull the handle 108 back to its vertical or central position. This is prevented, however, by the friction of the lower edge of the handle socket 110, against the spherical surface of the cap 102, the angle of contact being such that the friction is greater than the rotating force created on the handle by the springs. Thus, the handle will remain wherever the operator leaves it until the operator purposely causes it to move, either to change the proportions of the mixture or the quantity of the flow, or to shut it off completely. In case any one or two of the orifices are open, they can both be closed in one operation by moving the handle 108 to its vertical or central position.

This is a simple and easy operation and a valve assembly could be considered complete with no more parts than have heretofore been described.

While the previously described method of closing the orifices entails a simple and easy operation, there is no assurance that the valve will be completely closed, as is also the case in connection with valves now in common use, as slightly careless operation can easily result in the handle not being moved the proper distance. I have therefore provided additional means to simplify the closing of the orifices and to insure their complete closure.

Figure 8:
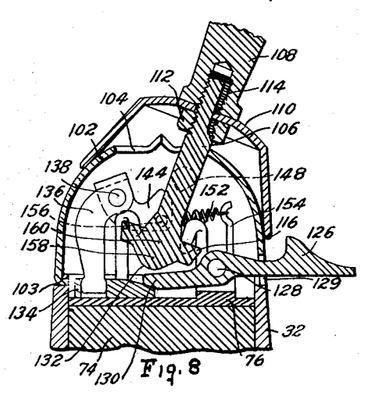
Figure 8 is a fragmentary vertical cross sectional view of the same embodiment, corresponding to Figure 1, showing the valve operating mechanism with the control handle in the forward position, so as to open one or both of the rear valves.
Figure 9:
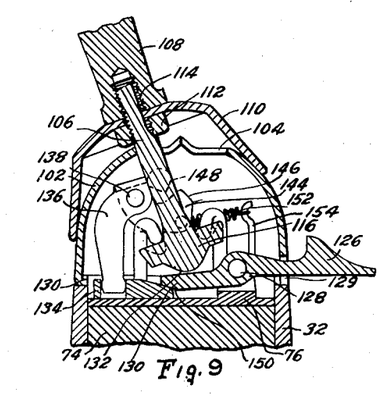
Figure 9 is a fragmentary vertical cross sectional view of the same portion of the mechanism as shown in Figure 8, but with the control handle in the rearward position, so as to open one or both of the front valves.
Figure 10:
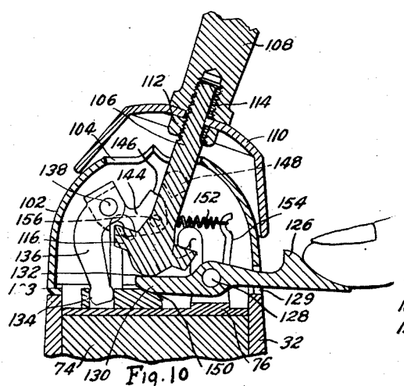
Figure 10 is a fragmentary vertical cross sectional view corresponding to Figure 8, showing the mechanism at the instant that the release lever has been pressed, so as to cause the closing of the valves.

A release lever 126 is pivoted to the retainer 76 by means of a pin 128. This release lever 126 projects through an aperture 129 formed by aligning slots in the top of body 32 and the lower edge of cap 102. This release lever 126 has at its inner end a prong 130, the upper surface of which is immediately below the partially spherical end 132 of pivot member 106. If the handle 108 has been moved out of its vertical or central position, as shown in Figures 8 and 9, so as to cause certain of the orifices to be opened and if then the outer end of the release lever is pressed by the operator, prong 130 of the release lever will contact spherical end 132 of the pivot member and further movement of the release lever will cause the entire handle assembly to rise, as shown in Figure 10, so that handle socket 110 will no longer be in firm contact with the spherical surface of cap 102. This being the case, the friction between these parts becomes negligible and the handle is now free to be returned to its central position by the springs 92 above whatever orifices have been opened, and the handle will be moved until all orifices have been closed, at which time all of the springs will have lost their power to move the control handle. While, to clarify the illustration, Figure 10 shows the handle assembly raised to such an extent that there is a considerable gap between the lower edge of the handle socket and the spherical surface of the cap 102, actually, only the very slightest clearance is necessary to remove the friction between these parts. Due to the lightness of the parts to be moved and the amount of the pressure of the springs, the chance that the operator will cease to press the release lever 126 before the orifices are completely closed is very remote. The mechanism described above, therefore, provides a multiple valve with means of very simply and almost surely effecting complete closure of any open valves. This valve assembly, as heretofore described, will therefore constitute a highly satisfactory mechanism.

While it is highly probable that the operator will still be pressing the release lever 126 when the handle 108 has returned to its central position, thereby insuring the closing of all valves, there is a rather remote possibility that the operator may let go of the release lever so quickly that the handle will not have had time to complete its return, in which case one or more of the orifices may be left partially open. To prevent this, detaining means are added. A detent 134 slides on the upper surface of retainer 76 in suitable guides, not shown, and is caused to move by a rocker arm 136 which is pivoted at 138 to arms 140 and 142 which are attached to the retainer 76. The rocker arm 136 has projection 144, which ends in an upwardly extending cam portion 146 which contacts the lower side of projection 148 on pivot member 106 when the handle 108 is in its central position, as shown in Figure 1. When the handle is in this position, the rocker arm 136 causes detent 134 to be at approximately the extreme limit of its travel away from release lever 126, so that the tapered surface 150 of the detent, which extends under the end of the prong 130 of the release lever 126, allows the release lever to rotate sufficiently counterclockwise, as viewed in Figure 1, so that the upper surface of the prong 130 will not touch the partially spherical lower portion 132 of pivot member 106 and the release lever will be thus moved counterclockwise by extension spring 152, which at one end engages arm 154, which is an integral part of the release lever 126, while the other end engages pin 156 on rocker arm 136. When the handle 108 is moved either forwardly, as shown in Figure 8, or backwardly, as shown in Figure 9, it will be seen that the cam surface 146 on rocker arm 136 no longer contacts projection 148 on pivot member 106 so that the rocker arm 136 tends to rotate clockwise under the pull of spring 152 on pin 156 but is prevented from doing so because the same spring 152 is causing prong 130 of release lever 126 to bear downwardly upon the tapered surface 150 of detent 134 with sufficient pressure so that the friction between the prong 130 and the detent 134 and between detent 134 and retainer 76 is sufficient to prevent any movement of either detent 134 or release lever 126, neither of which can move under the action of spring 152 without the other being moved counter to the action of this same spring. The moment arm of the spring on rocker arm 136 is so small in comparison to the moment arm of the spring on the release lever 126 that there is no possibility of the detent 134 forcing the prong 130 of the release lever 126 upwardly, while the slope of the surface of detent 134 where it contacts prong 130 is so slight that the prong cannot force the detent away. Therefore, detent 134, rocker arm 136 and release lever 126 will not move unless actuated by some external force.

Figure 11:
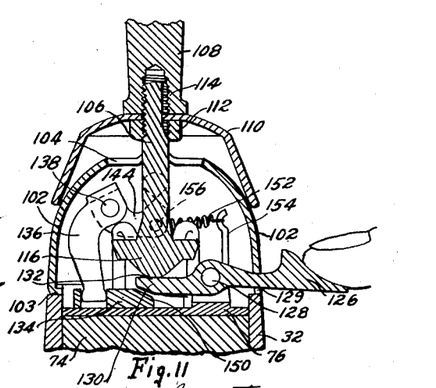
Figure 11 shows the same mechanism as Figure 10 at the instant that the control mechanism has reached the central or closed position, but before the operator has ceased to press the release lever.
Figure 12:
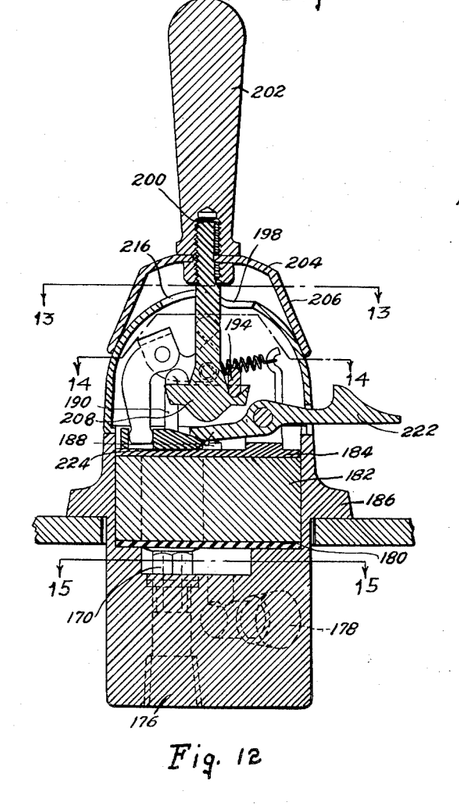
Figure 12 is a vertical cross sectional view of a second embodiment of my invention, showing the parts as they would be when all valves are in their closed positions. This view is taken approximately along the cross sectional line 12—12 of Figure 14.
Figure 13:
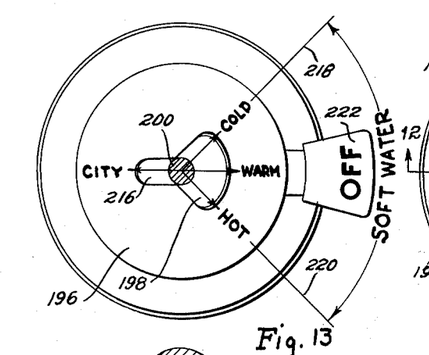
Figure 13 is a horizontal cross sectional view of this second embodiment, taken approximately along the cross sectional line 13—13 of Figure 12, with the handle socket omitted.
Figure 14:
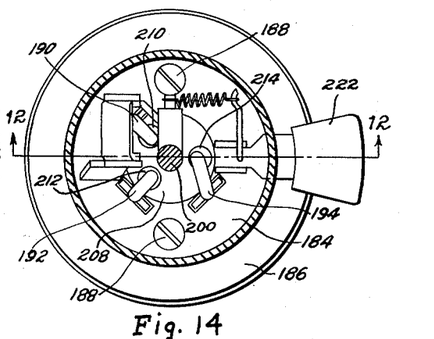
Figure 14 is a horizontal cross sectional view of this second embodiment, taken approximately along the cross sectional line 14—14 of Figure 12, showing a top view of the valve operating mechanism.

However, if the outer end of the release lever 126 is pressed downwardly, as shown in Figure 10, the resultant raising of prong 130 allows detent 134 to move to the right, being actuated by the pull of spring 152 on rocker arm 136, so that the sloping surface 150 of the detent is always in contact with the lower side of the end of prong 130 on release lever 126. Since the slope of the surface 150 of the detent 134 is so slight that the pressure of prong 130 cannot force the detent backward, the detent will hold the release lever 126 in its farthest position of clockwise rotation, as viewed in Figure 10, to which it has been moved by the downward pressure of the outer end of the release lever. Thus, if the release lever has been pressed far enough so that the friction between socket 110 and cap 102 has been relieved and the handle 108 can be moved toward its central position by the action of the valve springs, then the release lever will stay in this position, even though the operator ceases to press on the outer end of the release lever, until projection 148 on pivot member 106 again contacts camming surface 146 on rocker arm 136, after which further movement of the handle 108 toward its central position will force rocker arm 136 to rotate clockwise around its pivot 138 and so move detent 134 to the left, as shown in Figure 11. If, at this time, the operator has ceased to press on the release lever, the release lever 126 will immediately rotate counterclockwise under the action of spring 152 and of the pressure of the handle assembly, allowing the handle assembly to lower until the lower edge of socket 110 is again in contact with cap 102. As the handle assembly lowers, the lowering of projection 148 will cause further clockwise rotation of rocker arm 136 and further movement to the left of detent 134 so that, after movement of the detent is once started, ample clearance between the prong 130 of the release lever and the spherical end 132 of the pivot member is assured and the inertia of the handle will complete the movement of the handle to approximately its central position. By providing a slight amount of lost motion in the valve actuating parts, it becomes unnecessary for the handle to stop exactly in its central position in order that all valves may be closed.

Since only the slightest disengagement of handle socket 110 and cap 102 is necessary in order to allow the handle to move freely under the pressure of the valve springs, only a very slight movement of the release lever 126 is required, after the top surface of prong 130 contacts the spherical end 132 of the pivot member 106, before handle 108 will start to move toward its vertical position. For this reason, even though the release lever is held stationary by the detent, it is possible that any slight irregularity in the surface of that portion of the cap 102 where the handle socket 110 makes contact may cause the handle to again cease its movement, preventing the complete closure of the orifices. To prevent this possibility, the center 158 of the spherical end 132 of pivot member 106 is offset directly downward from the center 160 of the spherical end of the cap 102, as will be seen by reference to Figure 1. Obviously, as the handle 108 is moved out of its vertical position, center 160 will remain stationary, but center 158 will rotate about center 160, as shown in Figure 8. If center 158 is directly below center 160 when the handle is in its vertical position, it is apparent that when the handle is moved out of its vertical position, center 158 will rise slightly. It necessarily follows, therefore, that if center 160 is held stationary, as is the case when the release lever 126 is pressed far enough so as to slightly raise the handle assembly, as shown in Figure 10, then, as the handle moves toward its central position, the clearance between handle socket 110 and cap 102 will increase slightly, removing any possibility that a slight irregularity in the surface of the cap 102 will stop the movement of the handle 108.

While some of the means used in this disclosure for detaining the release lever in releasing position and for assuring the movement of the handle, even though there are slight irregularities in the surface of the cap, are somewhat different from those shown in my application Serial No. 588,665, the general principles of operation and the results accomplished are the same.

It will be readily understood that the above described valve assembly, being a single unit with a single control handle, can replace two hot water valves or faucets and two cold water valves or faucets, or a total of four single and separately controlled valves or faucets such as are now commonly used in such applications as where a shower and a tub are used together or where a spray for dishes and vegetables is used in connection with a kitchen sink.

A modification of my invention is shown in Figures 12 to 15 inclusive. In this modification there are three orifices 170, 172 and 174, each of which is connected to a separate fluid inlet connection, such as connection 176 shown for orifice 170, and all of which open into the same fluid outlet connection shown dotted at 178 in Figure 15. To illustrate one example of the possible usages of this particular type of valve, orifice 170 may be connected to the hot soft water supply and orifice 172 to the cold soft water supply in a building where soft water is furnished in addition to the regular city supply, where cold water from the city supply may be connected to orifice 174. Extending across the tops of these orifices is a single diaphragm 180, above which is spring housing 182 held in position by retainer 184, secured to the main valve body 186 by means of screws 188. Spring housing 182 has three vertical cylindrical holes concentric with the three orifices, this construction corresponding to that explained in detail for the first embodiment. In each of the three cylindrical holes in spring housing 182 is a plunger, a disc and a compression spring of the same design and serving the same purpose as did the corresponding plunger 88, disc 90 and spring 92 in the first embodiment, as shown in Figure 2.

A lifter member engages each of the discs in the second embodiment, lifter member 190 engaging the disc above orifice 170, lifter member 192 engaging the disc above orifice 172 and lifter member 194 engaging the disc above orifice 174. Thus, for the same reasons as were set forth in describing the first embodiment, if lifter member 190 is raised, fluid will flow from orifice 170, which in our example is hot soft water, while if lifter member 192 is raised, cold soft water will flow from orifice 172, and if lifter member 194 is raised, cold city water will flow from orifice 174, any flow being discharged through the common outlet connection 178.

A cap 196 has an aperture 198 through which projects the stem of a pivot member 200, on which are carried the handle 202, the handle socket 204 and the lock nut 206. The aperture 198 limits the direction of motion of the handle assembly to those directions that will give the desired results. The lower end of the pivot member 200 is a disc-like section 208 having three depressions 210, 212 and 214 in its upper surface, into which depressions extend the downwardly pointing ends of lifter members 190, 192 and 194 respectively. When the handle 202 is moved to the left toward "City," as viewed in Figure 13, from its central position, so that the stem of pivot member 200 moves in slot 216 of aperture 198, the depression 214 will rise, raising lifter member 194 and causing orifice 174 to open so that cold city water will flow from the outlet. When the handle is moved along line 218 toward "Cold," lifter member 192 will rise, opening orifice 172 and allowing cold soft water to flow from the outlet, while moving the handle along line 220 toward "Hot" will raise lifter member 190, opening orifice 170 and allowing hot soft water to flow. If the handle is moved in some other direction from its central position between lines 218 and 220, a mixture of hot and cold soft water will flow, the proportions depending upon the direction of movement in the same manner as was explained in the mixing of hot and cold water in the first embodiment.

Although not necessary in order to provide an operable valve assembly, a release lever, such as 222 and a release lever detent 224 can be used in connection with this valve assembly and the operation of these parts will be identical to the operation of the corresponding parts in the first embodiment. Repetition of this description is therefore omitted.

It will be readily understood that this modification of my invention provides a single valve assembly with a single control handle which can take the place of three single and separately controlled valves or faucets, such as are now commonly used where the city water supply is so hard that soft water is in common use.

Figure 15:
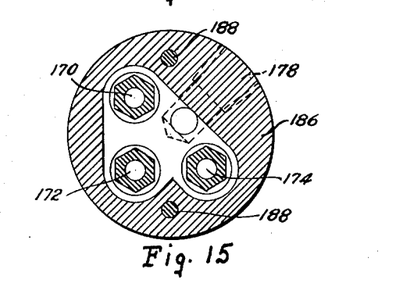
Figure 15 is a horizontal cross sectional view of this second embodiment approximately along the cross sectional line 15—15 of Figure 12, showing the water outlet chamber.
Figure 16:
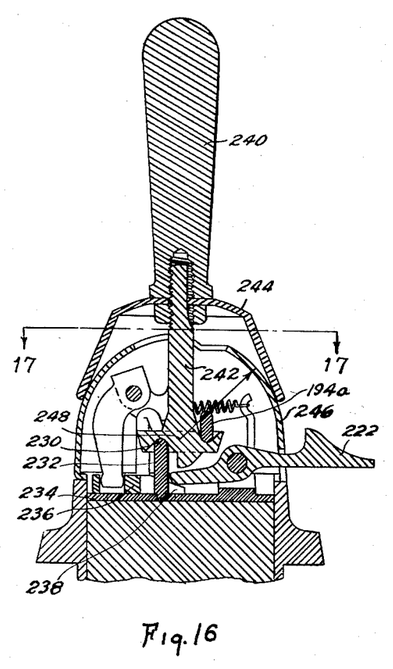
Figure 16 is a fragmentary vertical cross sectional view of a modification of the second embodiment, showing the parts as they would be when all valves are in their closed positions.
Figure 17:
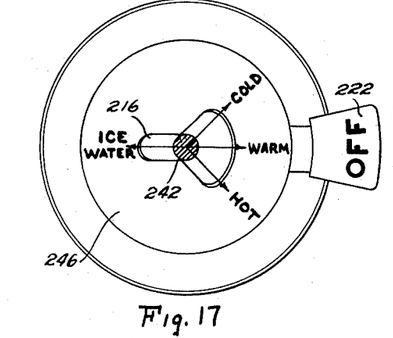
Figure 17 is a horizontal cross sectional view of the modification disclosed in Figure 16 and taken approximately along the cross sectional line 17—17 of Figure 16 with the handle socket omitted.
Figures 18, 20:
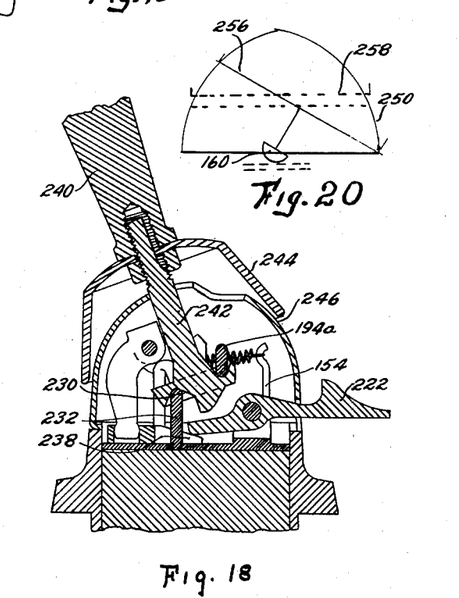
Figure 18 shows the same mechanism as is shown in Figure 16, but with the control handle in its rearward position, so as to open the forward valve.
Figure 20 is a diagrammatic view of the modified curved top shown in Figure 19, showing the socket in open position.

Figures 16, 17 and 18 show a slight modification of my second embodiment. The arrangement of orifices and their inlet and outlet connections are exactly the same as in the embodiment shown in Figures 12 to 15 inclusive. Likewise, the depressions in the top surface of the disc-like section of the pivot member and the aperture in the cap which controls the direction of movement of the handle are the same. In this modification, however, a depression 230 has been added to the lower side of the disc-like section of the pivot member, this depression having a spherical top and tapered sides, somewhat similar to the depressions on the upper surface, but inverted. Into this depression extends the vertical rod 232, which is fixed to the retainer 234. The upper end of the rod 232 is spherical so as to fit into the spherical end of the depression 230. In this modification, the detent 236 has a two-pronged end 238 so that the pin 232 is positioned in the slot between the prongs. If desired, this can be used as a guide means for the detent. All other parts of this valve assembly can be identical to the corresponding parts in the assembly shown in Figures 12 to 15 inclusive. Figure 15 applies equally well to the original second embodiment and to this modification and will therefore be used for reference in connection with the description of this modification.

In order to illustrate one example of the usage of this type of valve assembly, let us assume that orifice 170 is connected to the hot water supply, orifice 172 to the cold water supply and orifice 174 to a supply of chilled water, commonly termed "ice water." Since a supply of "ice water" is quite expensive to obtain and since there is seldom any occasion to go away and leave it running, it is common practice to have "ice water" valves or faucets self-closing. When handle 240 is moved to the left toward "Ice Water," as viewed in Figure 17, pivot member 242 rotates about the center of the spherical end of pin 232, as shown in Figure 18, causing the lower edge of handle socket 244 to go out of contact with a cap 246, so that there is no friction between these parts to hold the handle 240 in this position. This movement of the handle has raised lifter member 194a so that orifice 174 is open and ice water will flow from the outlet, but as soon as the operator releases handle 240, the downward pull of the valve spring used in connection with lifter member 194a will cause the handle 240 to return to its central position and orifice 174 will be closed. If the handle 240 is moved in any direction to the right of its central position, as viewed in Figure 17, the entire handle assembly will rotate about the center 248 of the spherical end of the cap 246, causing the spherical end of depression 230 to rise and to leave the spherical end of pin 232, so that this pin and this depression have no effect on the movement of the handle when moved in any direction from the central position away from "Ice Water." The operation to obtain hot or cold water or a mixture of the two is therefore identical with that of the assembly shown in the original second embodiment in Figures 12 to 15 inclusive.

It will be readily understood that this modification of the second embodiment of my invention provides a single valve assembly with a single control handle which can replace three single and separately controlled valves or faucets, two of which are of the "holding" type and one of the "self-closing" type, such as are commonly used in many places, such as hotels and other places where running "ice water" is provided in addition to the regular hot and cold water, all of which commonly flow from a single spout over the lavatory.

While the foregoing description and the drawings to which it refers are all based on valve assemblies having outlets that are to be connected to spouts, nozzles or other outlets that are not integral with the valve assemblies, it is obvious that the description is otherwise equally applicable to valve assemblies where the outlet spouts are made as integral parts of the bodies.

For simplification and increased clearness in the description, each embodiment is illustrated and described as having a handle that is in a vertical position when all valves are closed. There is nothing in the construction of the various valve assemblies, however, to prevent proper operation regardless of the direction in which these valve assemblies are mounted.

Figure 19:
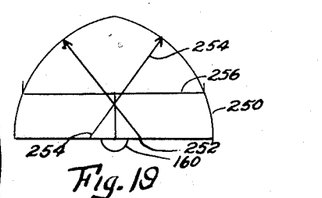
Figure 19 is a diagrammatic view of a modified curved top for supporting the handle socket.
Figure 21:
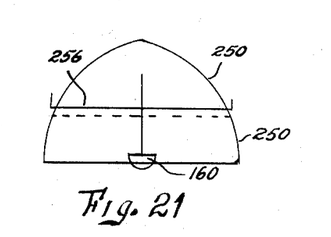
Figure 21 is another schematic diagram, showing the position of the socket after it has advanced to upright position.

In Figures 19, 20 and 21 a capping member 250 has been shown schematically. Instead of this capping member being semi-spherical, it constitutes a conical member generated by a curve having the radius 254 located off center. The radii 254 terminate at 252. By generating the conical capping member 250 in this manner, it is slightly pointed at the apex. When this type of capping member is used with a handle socket that has a circular base or lower edge 256, it will snugly fit the capping member 250 when the socket is in the horizontal position shown in Figure 19. When the faucet is opened by moving the handle, which has not been shown, and the socket into the full line position shown in Figure 20, the lower edge of the socket will be in the position shown by the full line 256.

The line 258, shown in dotted line in Figure 20, represents the height of a horizontal chord extending across the base of the capping member at right angles to the capping member shown by the full line in Figure 20. It can readily be seen that there is a clearance between this portion of the socket and the capping member 250. In other words, the socket, when adjusted from the horizontal position or the closed position into the open position, causes diametrically disposed areas of the socket to engage the capping member 250, leaving a clearance on either side, the points of contact being aligned with the line of maximum movement of the socket. This will take care of any irregularities or unevenness in the contour of the capping member and in the contour of the socket member. When the handle, that has not been shown, together with the base of the socket member 256 is adjusted to home position and the disc-like member 160, shown schematically, is held on the level to which it has been raised, as shown in Figure 21, it can be readily seen that the base of the socket 256 clears the entire periphery of capping member 250, thereby insuring freedom of movement of the socket to home position, without any frictional restraint. By permitting the disc-like portion 160 to be lowered into home position shown in Figure 19, the socket will then be seated on the spherical capping member 250.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a fluid valve assembly having multiple ports arranged in two groups, self-closing valve means for each port, single control means movable into two groups of directions from the closed position, said control means when moved into one group of directions selectively allowing the opening and permitting the closing of the ports in one group of ports and when moved into the other group of directions selectively allowing the opening and permitting the closing of the other group of ports, said control means allowing the opening of the ports in a group to any desired degree within the operative range of the valve assembly, means for holding said control means in any adjusted position, means for releasing said holding means, and means for detaining said releasing means for a sufficient period to permit the valve means to close completely.

2. In a fluid valve assembly, a main body member having a plurality of intake passages terminating in ports, self-closing valve means, one for each of the ports, means movable into two groups of directions for allowing the opening of said valve means, friction means for holding said movable means so as to allow the valve means to remain open to any desired degree within the operative range of the valve assembly, said friction means including a movable member and a stationary member, and means for separating said movable and said stationary members so as to release said friction holding means, said separating means being so formed that the distance of separation between said movable and said stationary members increases as the valve means approaches the closed position.

3. In a fluid valve assembly, a main body member having a pair of cavities, said main body having a plurality of intake passages terminating in ports, some of said ports being located in one of the cavities and the other ports being located in the other cavity, outlet passages, one for each of the cavities, valve means normally biased into closed position for closing said ports, operating means for allowing the opening of the valve means to any desired position within the operative range of the valve assembly, said operating means holding the valve means in any adjusted position, and means separate from and moving independently of said operating means for releasing the holding means to permit the valve means to move into closed position.

4. In a fluid valve assembly, a main body member having a pair of cavities, said main body having a plurality of intake passages terminating in ports, some of said ports being located in one of the cavities and the other ports being located in the other cavity, outlet passages one for each of the cavities, valve means normally biased into closed position for closing said ports, control means for allowing the opening of said valve means to any desired degree within the operative range of the valve assembly, said control means being adjustable to close said valve means, friction means for holding said control means so as to allow the valve means to remain open to any desired degree, means for releasing said holding means to permit the valve means to automatically close, means for holding the releasing means in releasing position during the closing of the valve, and means responsive to the control means for adjusting the releasing means into a non-releasing position upon the closure of the valve means.

5. In a fluid valve assembly, a main body member having a pair of cavities, said main body having a plurality of intake passages terminating in ports, some of said ports being located in one of the cavities and the other ports being located in the other cavity, outlet passages, one for each of the cavities, valve means normally biased into closed position for closing said ports, control means including an operating handle for allowing the valve means to open, means having an operative and an inoperative position, said last means holding the control means so as to allow the valve means to remain open when in the operative position, control means for actuating the holding means from operative to inoperative position to permit the valve means to automatically move into closed position, and means for holding the holding means in inoperative position while the valve means is moving into closed position.

6. In a fluid valve assembly, a main body member having a pair of cavities, said main body having a plurality of intake passages terminating in ports, some of said ports being located in one of the cavities and the other ports being located in the other cavity, outlet passages, one for each of the cavities, valve means normally biased into closed position, control means including an operating handle for allowing the valve means to remain open, means having an operative and an inoperative position, said last means holding the control means so as to allow the valve means to remain open when in the operative position, control means for actuating the holding means from operative to inoperative position to permit the valve means to automatically move into closed position, means for holding the holding means in inoperative position while the valve means is moving into closed position, and means responding to the operating handle for causing the holding means to move from inoperative position into operative position when the valve means reaches closed position.

7. In a valve assembly, a main body member having a pair of cavities, said body member including a plurality of intake passages terminating in ports located in the cavities, some of the ports being located in one cavity and the other ports in the other cavity, a diaphragm overlying both cavities, a valve supporting member, said valve supporting member overlying the diaphragm so as to clamp the diaphragm between the body member and the valve supporting member, a plurality of valves mounted in the valve supporting member and registering with the ports, means common to all of the valves, a handle movable from a home position to actuate said means, said handle being movable into two groups of directions, said handle when adjusted into one group of directions allowing the valves overlying the ports in one cavity to open, said handle when adjusted into the other group of directions allowing the valves overlying the ports in the other cavity to open, means for retaining the handle in any adjusted position within the operative range of the valve assembly, and independent means for releasing said retaining means to permit the valves to close and permitting the handle to return to home position.

8. In a fluid valve assembly having multiple ports arranged in two groups, a plurality of self-closing valve means, one for each of the ports, single operating means movable into two groups of directions from the closed position, said operating means when moved into one group of directions selectively allowing the opening and permitting the closing of the ports of one group of ports and when moved into the other group of directions selectively allowing the opening and permitting the closing of the ports of the other group of ports, said operating means being adjustable to permit closure of said valve means, friction means for holding the operating means so as to allow the valve means to remain open to any desired degree within the operative range of the valve assembly, means for releasing said holding means to permit the valve means to automatically close, means for holding the releasing means in releasing position during the closing of the valve, and means responsive to the operating means for adjusting the releasing means into a non-releasing position upon the closure of the valve means.

9. A valve assembly having multiple ports, self-closing valve means for closing each port, control means for allowing said valve means to open to any desired degree within the operative range of the valve assembly, means for holding the control means so as to allow the valve means to remain open to any desired degree, means for releasing said holding means, and means for holding said releasing means for a sufficient period so that any open valve will completely close, said control means including an operating member which moves in one group of directions from the closed position to open certain selected valve means and in a second group of directions from the closed position to open certain other selected valve means, one direction in the first group being directly opposite to one direction in the second group.

10. In a fluid valve assembly having multiple ports arranged in two groups, self-closing valve means for each port, single control means movable into two groups of directions from the closed positions, said control means when moved in one group of directions selectively allowing the opening or permitting the closing of the ports in one group of ports and when moved in the other group of directions selectively allowing the opening and permitting the closing of the other group of ports, said control means allowing the opening of the ports in a group to any desired degree within the operative range of the valve assembly, means for holding said control means in any adjusted position, and a second single control means moving independently of the first control means for releasing the holding means for all the valve means and for causing the first control means to automatically return to the closed position.

11. In a fluid valve assembly having three or more ports, valve means for each port, a single control means for allowing the opening selectively of said valve means, means for holding the control means so as to allow certain selected valve means to remain open to any desired degree within the operative range of the valve assembly, and pivotally mounted means for releasing the holding means, said pivotally mounted means being mounted in spaced relation from said control means so as to be unaffected by the movement of the control means.

12. In a fluid valve assembly having three or more ports with self-closing valve means for each port, a single control means movable in a number of directions from a home position for selectively allowing said valve means to open to any desired degree within the operative range of the valve assembly, and means for holding the control means so as to allow the valve means to remain open, said holding resulting from friction between a movable member integral with the control means and a stationary member, one of the last two members being cup-shaped with an arcuate cavity that contacts the arcuate surface of the other member, these last two members being so formed as to provide clearance between the two members in the region of minimum relative movement, while providing contact in the region of maximum relative movement so as to insure frictional contact in the region of maximum relative movement.

DONALD H. REEVES.

REFERENCES CITED

The following references are of record in the file of this patent:

UNITED STATES PATENTS

| Number | Name | Date |
|---|---|---|
| 721,562 | Hibbard | Feb. 24, 1903 |
| 954,898 | Sternberg | Apr. 12, 1910 |
| 1,574,767 | Thurtell | Mar. 2, 1926 |
| 1,584,895 | Rowe | May 18, 1926 |
| 1,890,767 | Block | Nov. 6, 1928 |
| 1,938,454 | Kellan | Dec. 5, 1933 |
| 2,205,684 | Cochran | June 25, 1940 |
| 2,211,167 | Safford | Aug. 13, 1940 |

FOREIGN PATENTS

| Number | Country | Date |
|---|---|---|
| 336,912 | Italy | Feb. 24, 1936 |